United States Patent
Veloso et al.

(10) Patent No.: US 10,904,803 B2
(45) Date of Patent: Jan. 26, 2021

(54) METHOD TO SELECT AUTOMATICALLY PRIMARY AND SECONDARY NETWORKS TO SUPPORT EMERGENCY CALLS AND REMOTE COMMANDS IN VEHICLES

(71) Applicant: GM Global Technology Operations LLC, Detroit, MI (US)

(72) Inventors: Alex J. Veloso, Rochester Hills, MI (US); Dipankar Pal, Sylvania, OH (US); Woongjin Lim, Lincolnshire, IL (US); George Knish, Rochester Hills, MI (US); Scott T. Droste, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/421,861

(22) Filed: May 24, 2019

(65) Prior Publication Data

US 2020/0374766 A1    Nov. 26, 2020

(51) Int. Cl.
*H04W 36/00* (2009.01)
*H04W 36/30* (2009.01)
*H04B 17/382* (2015.01)
*H04B 17/318* (2015.01)

(52) U.S. Cl.
CPC ...... *H04W 36/0069* (2018.08); *H04B 17/318* (2015.01); *H04B 17/382* (2015.01); *H04W 36/30* (2013.01)

(58) Field of Classification Search
CPC . H04W 36/00; H04W 36/0069; H04W 36/20; H04W 36/30; H04B 17/318; H04B 17/382
See application file for complete search history.

(56) References Cited

U.S. PATENT DOCUMENTS

| | | | |
|---|---|---|---|
| 2013/0157662 A1* | 6/2013 | Han | H04W 48/18 455/436 |
| 2015/0065132 A1* | 3/2015 | Ramkumar | H04W 48/16 455/435.3 |
| 2015/0141012 A1* | 5/2015 | Ramkumar | H04B 1/3816 455/435.3 |
| 2016/0021660 A1* | 1/2016 | Krishnamurthy | H04W 68/02 455/452.1 |

(Continued)

*Primary Examiner* — Candal Elpenord

(57) ABSTRACT

A method of selecting primary and secondary cellular networks for a vehicle comprises measuring cellular connectivity parameters for cellular communication between a first subscriber identity module (SIM) and a first cellular network and for cellular communication between a second SIM and a second cellular network, comparing measured cellular connectivity parameters for the first SIM to measured cellular connectivity parameters for the second SIM, designating one of the first SIM and the first cellular network and the second SIM and the second cellular network as a primary network, and designating the other one of the first SIM and the first cellular network and the second SIM and the second cellular network as a secondary network, measuring cellular connectivity parameters for the primary and secondary networks, comparing the measured cellular connectivity parameters for the primary and secondary networks, switching designation of the primary and secondary network based on measured cellular connectivity parameters.

16 Claims, 2 Drawing Sheets

(56) References Cited

U.S. PATENT DOCUMENTS

| | | | |
|---|---|---|---|
| 2016/0204908 A1* | 7/2016 | Rafique | H04L 1/0014 |
| | | | 370/252 |
| 2016/0309407 A1* | 10/2016 | Ngai | H04L 43/16 |
| 2016/0374014 A1* | 12/2016 | Anyuru | H04L 63/0853 |
| 2017/0006530 A1* | 1/2017 | Shi | H04W 36/0022 |
| 2017/0055201 A1* | 2/2017 | Murray | H04W 48/16 |
| 2017/0094628 A1* | 3/2017 | Miao | H04W 36/08 |
| 2017/0127436 A1* | 5/2017 | Li | H04W 52/367 |

* cited by examiner

METHOD TO SELECT AUTOMATICALLY PRIMARY AND SECONDARY NETWORKS TO SUPPORT EMERGENCY CALLS AND REMOTE COMMANDS IN VEHICLES

INTRODUCTION

The present disclosure relates to cellular communications within a vehicle that is capable of utilizing multiple cellular networks. Cellular networks (or cellular carrier systems) provide cellular communications for a variety of cellular devices, referred to broadly herein as user equipment (UE). In some instances, for certain mobile user equipment, it is desirable to constantly have cellular connectivity. Certain locations experience distinct levels of cellular service, and in some instances, cellular coverage for a particular location may vary depending on a variety of factors.

In some vehicles, a cellular call is automatically made to contact emergency services when the onboard vehicle systems detect that an accident has occurred. Generally, an emergency call is initiated right after a vehicle collision event or when the operator of the vehicle presses an emergency button. When there is no cellular network coverage from a contracted carrier, current systems keep trying to establish a phone call with a back office. This call may never be established, depending on cellular network conditions.

Additionally, under normal operating conditions, while a vehicle is moving, cellular connectivity to a contracted carrier may be strong at one location, but as the vehicle moves relative to network antennas, and through varying environmental conditions, the cellular connectivity via the contracted carrier may not be sufficient to read a SMS message to support a remote action to execute a function such as vehicle door lock.

Therefore, while current systems achieve their intended purpose, there is a need for a cellular communication system for a vehicle that utilizes multiple cellular networks and continuously identifies which of the two networks has the best cellular connectivity and designates that cellular network as a primary network for cellular communications from the vehicle.

SUMMARY

According to several aspects of the present disclosure, a cellular communication system for a vehicle comprises a controller, a modem adapted to enable communication between the controller and a plurality of cellular networks, a plurality of subscriber identity modules (SIMs) within the controller, each of the plurality of SIMs adapted to provide cellular communication with a specified cellular network via the modem, and a driver interface mounted within the vehicle and adapted to allow the driver of the vehicle to communicate with the controller. Wherein the controller is adapted to evaluate each of the plurality of SIMs, compare each of the plurality of SIMs to one another, and to designate one of the plurality of SIMs and the corresponding specified cellular network as a primary network, and further wherein, the controller is adapted to continuously re-evaluate each of the plurality of SIMs, compare each of the plurality of SIMs to one another, and designate one of the plurality of SIMs and the corresponding specified cellular network as a primary network to be ready in advanced when a communication service is demanded.

According to another aspect of the present disclosure, the plurality of SIMs within the controller comprise a dual SIM dual standby system including a first SIM adapted to communicate with a first cellular network and a second SIM adapted to communicate with a second cellular network.

According to another aspect of the present disclosure, the controller is adapted to measure cellular connectivity parameters for the first and second SIMs, wherein the first and second SIMs are evaluated and compared to one another based on the measured cellular connectivity parameters.

According to another aspect of the present disclosure, the cellular connectivity parameters include a cellular signal strength parameter.

According to another aspect of the present disclosure, the cellular signal strength parameter is a received signal strength indicator (RSSI).

According to another aspect of the present disclosure, the cellular connectivity parameters include a bit error rate (BER).

According to another aspect of the present disclosure, the controller is adapted to designate one of the first and second SIMs and the corresponding specified cellular network as the primary network and to designate the other one of the first and second SIMs and the corresponding specified cellular network as the secondary network.

According to another aspect of the present disclosure, the controller is adapted to switch designation of the primary and secondary network when the measured RSSI for the secondary network exceeds the measured RSSI for the primary network by a pre-determined margin.

According to another aspect of the present disclosure, the controller is adapted to switch designation of the primary and secondary network when the measured BER for the primary network exceeds the measured BER for the secondary network by a pre-determined margin.

According to another aspect of the present disclosure, the controller is adapted to evaluate the primary and secondary networks to ensure the primary network can support functions of the cellular communication system in a plurality of power modes.

According to another aspect of the present disclosure, the plurality of power modes includes a normal mode, wherein an engine of the vehicle is running and all functionality of the communication system is available, a discontinuous mode (DRX), wherein the engine is off, the controller is in sleep mode, but still can listen Cellular Remote Commands via SMS message, and back-up mode (BUB), wherein the vehicle battery is disconnected and the communication system runs on back-up power for emergency communications.

According to several aspects of the present disclosure, a cellular communication system for a vehicle comprises a controller, a dual SIM dual standby system including a first SIM adapted to communicate with a first cellular network and a second SIM adapted to communicate with a second cellular network, a modem adapted to enable communication between the first SIM and the first cellular network and communication between the second SIM and the second cellular network, and a driver interface mounted within the vehicle and adapted to allow the driver of the vehicle to communicate with the controller, wherein, the controller is adapted to measure received signal strength indication (RSSI) and bit error rate (BER) for each of the first and second SIMs and to designate one of the first and second SIMs and the corresponding specified cellular network as the primary network and to designate the other one of the first and second SIMs and the corresponding specified cellular network as the secondary network based on the measured RSSI and BER for each of the first and second SIMs.

According to another aspect of the present disclosure, the controller is adapted to switch designation of the primary and secondary network when the measured RSSI for the secondary network exceeds the measured RSSI for the primary network by a pre-determined margin.

According to another aspect of the present disclosure, the controller is adapted to switch designation of the primary and secondary network when the measured BER for the primary network exceeds the measured BER for the secondary network by a pre-determined margin.

According to another aspect of the present disclosure, the controller is adapted to evaluate the primary and secondary networks to ensure the primary network can support functions of the cellular communication system in a plurality of power modes including, a normal mode, wherein an engine of the vehicle is running and all functionality of the communication system is available, a discontinuous mode (DRX), wherein the engine is off, the communication system is not active, but can receive signals, and a back-up mode (BUB), wherein the vehicle battery is disconnected and the communication system runs on back-up power for emergency communications.

According to several aspects of the present disclosure, a method of selecting a primary and a secondary cellular network for a vehicle comprises measuring cellular connectivity parameters for cellular communication between a first subscriber identity module (SIM) and a first cellular network, measuring cellular connectivity parameters for cellular communication between a second SIM and a second cellular network, wherein, the first and second SIMs comprise a dual SIM dual standby system with a single modem, comparing the measured cellular connectivity parameters for the first SIM to the measured cellular connectivity parameters for the second SIM, designating one of the first SIM and the first cellular network and the second SIM and the second cellular network as a primary network, and designating the other one of the first SIM and the first cellular network and the second SIM and the second cellular network as a secondary network, measuring cellular connectivity parameters for the primary network and the secondary network, comparing the measured cellular connectivity parameters for the primary and secondary networks, and switching designation of the primary and secondary network based on the measured cellular connectivity parameters for the primary and secondary networks.

According to another aspect of the present disclosure, measuring cellular connectivity parameters for cellular communication between a first SIM and a first cellular network, and measuring cellular connectivity parameters for cellular communication between a second SIM and a second cellular network further includes measuring a received signal strength indicator (RSSI) and a bit error rate (BER) for each of the first SIM and first cellular network, and second SIM and second cellular network.

According to another aspect of the present disclosure, switching designation of the primary and secondary networks based on the measured cellular connectivity parameters for the primary and secondary networks further includes switching designation of the primary and secondary networks when the measured RSSI for the secondary network exceeds the measured RSSI for the primary network by a pre-determined margin.

According to another aspect of the present disclosure, switching designation of the primary and secondary networks based on the measured cellular connectivity parameters for the primary and secondary networks further includes switching designation of the primary and secondary networks when the measured BER for the primary network exceeds the measured BER for the secondary network by a pre-determined margin.

According to another aspect of the present disclosure, measuring cellular connectivity parameters for the primary network and the secondary network further includes measuring cellular connectivity parameters for the primary network and the secondary network in a plurality of power modes, including a normal mode, wherein an engine of the vehicle is running and all functionality of the communication system is available, a discontinuous mode (DRX), wherein the engine is off, the communication system is not active, but can receive signals, and a back-up mode (BUB), wherein the vehicle battery is disconnected and the communication system runs on back-up power for emergency communications.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
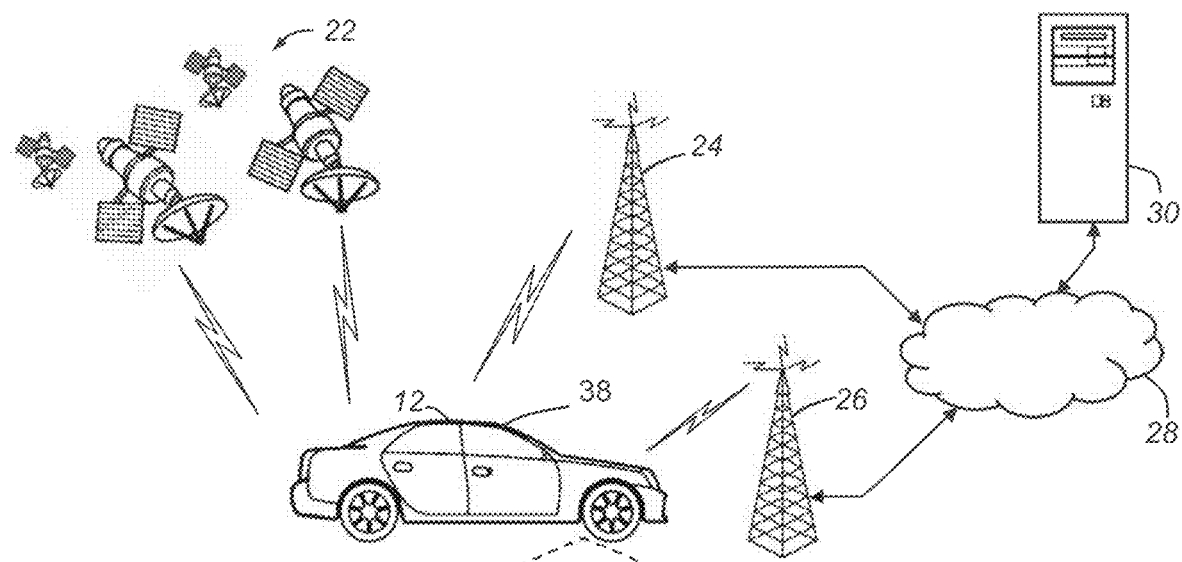
FIG. 1 is schematic view of a cellular communication system in accordance with an exemplary embodiment of the present disclosure.
Figure 1:
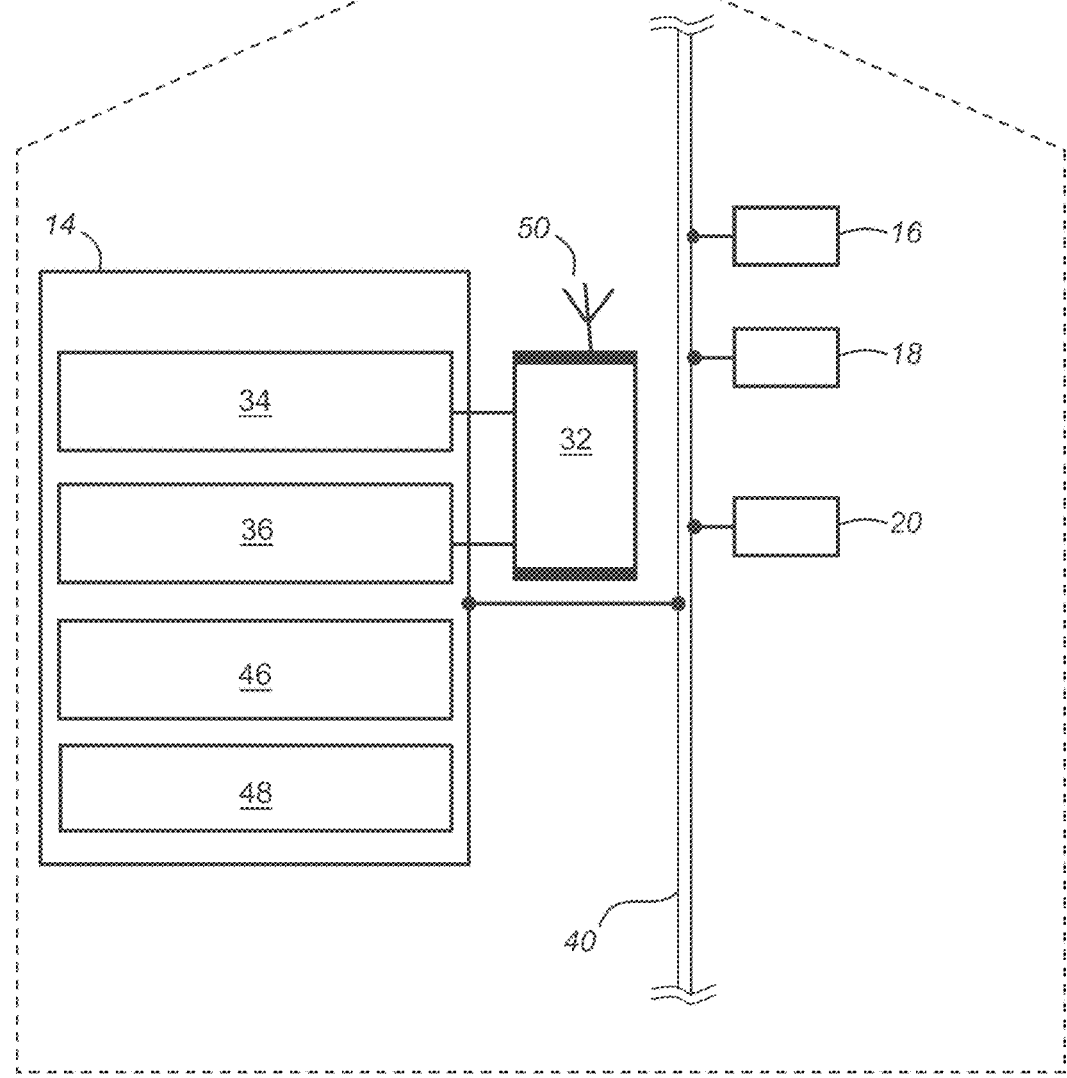

The following description is merely exemplary in nature and is not intended to limit the present disclosure, application, or uses. Referring to FIG. 1, an operating environment is shown that comprises a cellular communication system 10 for a vehicle 12. The communications system 10 generally includes a vehicle 12 with a telematics controller 14 and other vehicle system modules 16, 18, 20, a plurality of global navigation satellite system (GNSS) satellites 22, one or more cellular networks 24, 26, a land communications network 28, and a remote server 30.

A modem 32 is adapted to enable communication between the controller 14 and the cellular networks 24, 26. The controller 14 includes a plurality of subscriber identity modules (SIMs) 34, 36 within the controller 14. Each of the plurality of SIMs 34, 36 is adapted to provide cellular communication with a specified cellular network 24, 26 via the modem 32. A driver interface 38 is mounted within the vehicle 12 and is adapted to allow the driver of the vehicle 12 to communicate with the controller 14.

The vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. The vehicle system modules 16, 18, 20 include a global navigation satellite system (GNSS) receiver 16, a body control module (BCM) 18, an engine control module (ECM) 20. Some or all of the different vehicle system modules 16, 18, 20 may be connected for communication with each other via a communications bus 40. The communications bus 40 provides network connections using one or more network protocols and can use a serial data communication architecture. Examples of suitable network connections include, but are not limited to, a controller area network (CAN), a media oriented system transfer (MOST), a local interconnection network (LIN), a local area network (LAN), and other appropriate connections such as Ethernet or others that conform with known ISO, SAE, and IEEE standards and specifications.

The vehicle 12 can also include other vehicle systems in the form of electronic hardware components that are located throughout the vehicle 12 and which may receive input from one or more sensors and use the sensed input to perform diagnostic, monitoring, control, reporting, and/or other functions. Each of the vehicle systems can be connected by the communications bus 40 to other systems, as well as to the controller 14, and can be programmed to run vehicle system and subsystem diagnostic tests. Moreover, each of the systems can include and/or be communicatively coupled to suitable hardware that enables intra-vehicle communications to be carried out over the communications bus 40. Such hardware can include, for example, bus interface connectors and/or modems. One or more systems may periodically or occasionally have their software or firmware updated and, in some embodiments, such vehicle updates may be over the air (OTA) updates that are received from a remote server 30 via a land network 28 and the controller 14. As is appreciated by those skilled in the art, the above-mentioned systems are only examples of some of the modules that may be used in the vehicle 12, as numerous others are also possible.

The land network 28 may be a conventional land-based telecommunications network that is connected to one or more landline telephones and connects the cellular networks 24, 26 to the remote server 30. For example, the land network 28 may include a public switched telephone network (PSTN) such as that used to provide hardwired telephony, packet-switched data communications, and the Internet infrastructure. One or more segments of the land network 28 could be implemented through the use of a standard wired network, a fiber or other optical network, a cable network, power lines, other wireless networks such as wireless local area networks (WLANs), networks providing broadband wireless access (BWA), or any combination thereof.

The remote server 30 (only one shown) can be one of a number of computers accessible via a private or public network such as the Internet. Although only a single remote server is referred to herein, the "remote server 30" can include one or more remote servers. The remote server 30 can be used for one or more purposes, such as for providing information regarding user equipment. In some embodiments, the remote server 30 can be, for example, a service center computer where diagnostic information and other vehicle data can be uploaded from the vehicle, a client computer used by the vehicle owner or other subscriber for various purposes, such as accessing and/or receiving vehicle sensor data (or other data), as well as setting up and/or configuring subscriber preferences or controlling vehicle functions, a car sharing server which coordinates registrations from a plurality of users who request to use a vehicle as part of a car sharing service, or a third party repository to or from which vehicle sensor data or other information is provided, whether by communicating with the vehicle 12, remote server 30, or both.

The global navigation satellite system (GNSS) receiver 16 receives radio signals from satellites 22. The GNSS receiver 16 can be configured to comply with and/or operate according to particular regulations or laws of a given geopolitical region (e.g., country). The GNSS receiver 16 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems.

The body control module (BCM) 18 can be used to control various systems of the vehicle, as well as obtain information concerning the systems, including their present state or status, as well as sensor information. The BCM 18 is shown in the exemplary embodiment of FIG. 1 as being electrically coupled to the communication bus 40. In some embodiments, the BCM 18 may be integrated with or part of a center stack module (CSM). Or, the BCM 18 may be a separate device that is connected to other systems via the communication bus 40.

The engine control module (ECM) 20 may control various aspects of engine operation such as fuel ignition and ignition timing. The ECM 20 is connected to the communications bus 40 and may receive operation instructions (or vehicle commands) from the BCM 18 or other vehicle system modules, such as the controller 14.

Additionally, the BCM 18 and/or the ECM 20 may provide vehicle state information corresponding to the vehicle state or of certain vehicle components or systems, including the vehicle system modules 16, 18, 20 discussed herein. For example, the BCM 18 and/or the ECM 20 may provide the controller 14 with information indicating whether the engine of the vehicle 12 is on or off, and battery information from a vehicle battery system, etc.

The controller 14 is adapted to evaluate each of the plurality of SIMs 34, 36, and to compare each of the plurality of SIMs 34, 36 to one another, and designate one of the plurality of SIMs 34, 36 and the corresponding specified cellular network 24, 26 as a primary network. Further, the controller 14 is adapted to continuously re-evaluate each of the plurality of SIMs 34, 36, compare each of the plurality of SIMs 34, 36, to one another, and designate one of the plurality of SIMs 34, 36 and the corresponding specified cellular network 24, 26 as a primary network.

The communications system 10 shown in FIG. 1, and the plurality of SIMs 34, 36 comprise a dual SIM dual standby system, wherein a first SIM 34 is adapted to communicate with a first cellular network 24 and a second SIM 36 is adapted to communicate with a second cellular network 26. The controller 14 is capable of carrying out cellular communications using either the first or second SIM 34, 36, the modem 32, a processor 46, memory 48, and an antenna 50. In one embodiment, the controller 14 may be a standalone module or, in other embodiments, the controller 14 may be incorporated or included as a part of one or more other vehicle system modules, such as a center stack module (CSM), GNSS receiver 16, BCM 18, an infotainment module, a head unit, and/or a gateway module.

Dual SIM dual standby, also known as DSDS, is the modern take on Dual SIM functionality. Traditionally, Dual SIM means two separate SIMs can be used. Dual SIM dual standby (DSDS) allows a user to choose which of those two SIMs is able to place and receive calls, though the device itself would utilize one radio frequency through a single modem. On the other hand, dual SIM Dual active (DSDA) technology allows both SIMs to receive calls simultaneously, though the device itself would utilize two radio frequencies through a single modem. DSDS combines the best of all these functions together for our proposal, allowing the use of one of the SIMs based on the best network condition while utilizing just one radio frequency through a single modem. As the name suggest this type of system supports both SIMs in standby mode. As long an neither SIM is being used, both SIMs are on standby and ready to be used when demanded by telematics service based on the best network condition. Once one of the two SIMs is engaged, the other one becomes inactive.

The processor 46 can be any type of device capable of processing electronic instructions including microprocessors, microcontrollers, host processors, controllers, vehicle communication processors, and application specific integrated circuits (ASICs). The processor 46 can be a dedicated processor used only by the controller 14 for cellular communications or can be shared with other vehicle systems. The processor 46 executes various types of digitally-stored instructions, such as software or firmware programs stored in the memory 48, which enable the controller 14 to provide a wide variety of services. The memory 48 may be a non-transitory computer-readable medium, such as a powered temporary memory or any suitable non-transitory, computer readable medium, such as different types of RAM (random-access memory, including various types of dynamic RAM (DRAM) and static RAM (SRAM)), ROM (read-only memory), solid-state drives (SSDs) (including other solid-state storage such as solid-state hybrid drives (SSHDs)), hard disk drives (HDDs), or magnetic or optical disc drives.

The modem 32 can include or be associated with subscription information, such as an International Mobile Station Identifier (IMSI), or other user equipment related information, such as an International Mobile Equipment Identifier (IMEI). The modem 32 can communicate with different cellular service providers (e.g., Verizon™, AT&T™). The cellular networks 24, 26 may be any suitable cellular telephone system, and can include cellular networks of multiple different cellular providers. The cellular networks 24, 26 may utilize any number of the following components (e.g., depending on the cellular technology): cellular towers, base transceiver stations, mobile switching centers, base station controllers, evolved and next generation nodes (e.g., eNodeBs, gNodeBs), mobility management entities (MMEs), access and mobility management function entities (AMFs), serving and PGN gateways, etc., as well as any other networking components required to connect the cellular networks 24, 26 with the land network 28 or to user equipment in the vehicle.

The cellular networks 24, 26 can implement any suitable communications technology, including GSM/GPRS technology, CDMA or CDMA2000 technology, LTE technology, 5G NR (New Radio) technology, etc. In general, the cellular networks 24, 26, their components, the arrangement of their components, the interaction between the components, etc. is generally known in the art.

The controller 14, by communicating with other vehicle systems through the communication bus 40, is adapted to measure cellular connectivity parameters for the first and second SIMs 34, 36. The first and second SIMs 34, 36 are evaluated and compared to one another based on the measured cellular connectivity parameters. The cellular connectivity parameters include a cellular signal strength parameter. In an exemplary embodiment, the cellular communications system measures a received signal strength indicator (RSSI) and a bit error rate (BER) for each of the SIMs 34, 36.

The controller is adapted to designate one of either the first SIM 34 and the first cellular network 24, or the second SIM 36 and the second cellular network 26 as the primary network and to designate the other one of the first and second SIMs 34, 36 and the corresponding specified cellular network 24, 26 as the secondary network. As the controller 14 continuously monitors the RSSI and the BER for the primary and secondary networks, the controller will switch the designations if the cellular connectivity of the secondary network becomes better than the cellular connectivity of the primary network. When an emergency call is initiated after a vehicle collision event or when a user manually initiates a call, such as by pressing the 3BA emergency button, the controller has already identified the better of the first SIM 34 and the first cellular network 24, and the second SIM 36 and the second cellular network 26, and has designated that SIM and network as the primary network. The vehicle will automatically use the primary network, thus avoiding multiple attempts of connecting to a network when there is no cellular network coverage. The current method switches the primary and secondary network designations in advance.

In an exemplary embodiment, the controller 14 is adapted to switch designation of the primary and secondary networks when the measured RSSI for the secondary network exceeds the measured RSSI for the primary network by a predetermined margin. RSSI is a measurement of relative signal strength, therefore, if the RSSI for the secondary network is higher than the RSSI for the primary network, that is an indication that cellular connectivity of the secondary network is better than the primary network and switching the primary/secondary designations may be appropriate. Rather than switching any time the measured value of RSSI for the secondary network jumps above the measured value of RSSI for the primary network, the controller 14 is adapted to only switch if the measured RSSI of the secondary network, over a pre-determined time interval, exceeds that of the primary network by a pre-determined margin.

Figure 2:
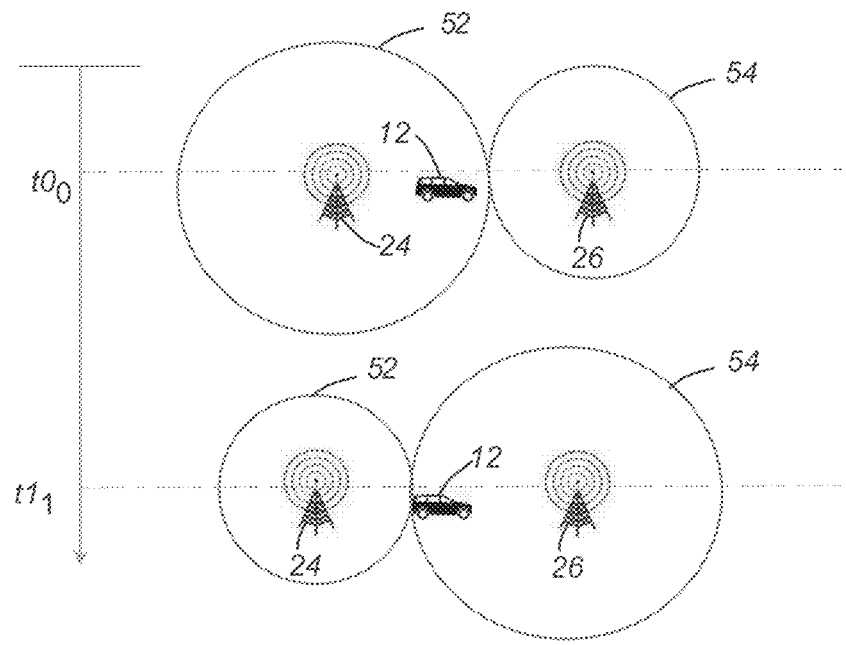
FIG. 2 is a schematic illustration of how cellular coverage for a vehicle changes.

Referring to FIG. 2, an illustrative representation of how the communication system 10 functions is shown. The first cellular network 24 includes a first cellular coverage area 52 that is provided by (or otherwise associated with) the first cellular network 24. The second cellular network 26 includes a second cellular coverage area 54 that is provided by (or otherwise associated with) the second cellular network 26. The first cellular network 24 and the first cellular coverage area 52 are associated with a first cellular provider, and the second cellular network 26 and the second cellular coverage area 54 are associated with a second cellular provider. For example, the first cellular provider may be Verizon™ and the second cellular provider may be AT&T™.

The vehicle 12 is positioned within the first cellular coverage area 52 at time t0 and not within the second coverage area 54 at time t0. The controller will measure better cellular connectivity from the first cellular network and will designate the first SIM 34 and the first cellular network 24 as the primary network and the second SIM 36 and the second cellular network 26 as the secondary network. In the illustrated scenario, the first coverage area 52 changes such that the vehicle 12 is no longer within the first coverage area 52 at time t1, and the second coverage area 54 changes such that the vehicle 12 is now located within the second coverage area 54 at time t1. The controller 14 will detect that the cellular connectivity of the second SIM 36 and the second cellular network 26 has become better than the cellular connectivity of the first SIM 34 and the first cellular network 24, and will switch the designations, so at t1, the second SIM 36 and the second cellular network 26 are designated as the primary network and the first SIM 36 and the first cellular network 26 are designated as the secondary network.

As described above, the vehicle 12, may be stationary, and the cellular coverage areas 53, 54 change due to signal power fluctuations, weather conditions, etc. Alternatively, the vehicle 12 may be moving, wherein the cellular coverage areas 53, 54 do not change, but the vehicle 12 moves from within the first cellular coverage area 52 to the second cellular coverage area 54. The communication system 10 will process either situation the same way to determine the primary and secondary networks.

In an exemplary embodiment, the controller 14 is adapted to switch designation of the primary and secondary networks when the measured BER for the primary network exceeds the measured BER for the secondary network by a pre-determined margin. BER is a measurement of errors in the transfer of data, therefore, if the BER for the primary network is higher than the BER for the secondary network, that is an indication that cellular connectivity of the secondary network is better than the primary network, and switching the primary/secondary designations may be appropriate. Rather than switching any time the measured value of BER for the primary network jumps above the measured value of BER for the secondary network, the controller 14 is adapted to only switch if the measured BER of the primary network, over a pre-determined time interval, exceeds that of the secondary network by a pre-determined margin.

The controller 14 is adapted to evaluate the primary and secondary networks to ensure the primary network can support functions of the cellular communication system 10 in a plurality of power modes. Any time neither of the primary or secondary networks is being used by the vehicle 12, both of the primary and secondary networks are in standby mode, and cellular connectivity of each can be measured and evaluated by the controller 14. The controller 14 will continue to measure and evaluate the primary and secondary networks in various power modes of the vehicle 12, such as a normal mode, wherein an engine of the vehicle 12 is running and all functionality of the communication system 10 is available, a discontinuous mode (DRX), wherein the engine is off, the communication system 10 is not active, but can receive signals, and back-up mode (BUB), wherein the vehicle battery is disabled and the communication system 10 runs on back-up power for emergency communications. When a user initiates a remote command, such as from an application on the user's cell phone, the command is routed to a back office which in turn sends an SMS message to the vehicle via a network. The vehicle 12 may be located where cellular coverage is weak or non-existent. The controller 14 has already identified the better of the first SIM 34 and the first cellular network 24, and the second SIM 36 and the second cellular network 26, and has designated that SIM and cellular network as the primary network. The vehicle 12 will automatically use the primary network to receive incoming commands via SMS messages from the back office.

Figure 3:
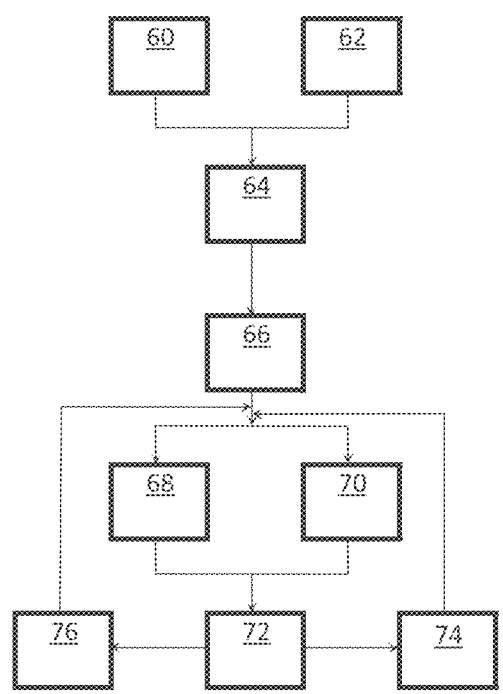
FIG. 3 is a block diagram illustrating a method according to an exemplary embodiment of the present disclosure.

Referring to FIG. 3, a block diagram illustrating a method of the present disclosure is shown. A method of selecting a primary and a secondary cellular network for a vehicle 12 begins at block 60, with measuring cellular connectivity parameters for cellular communication between the first subscriber identity module (SIM) 34 and the first cellular network 24. Simultaneously, at block 62, the method includes measuring cellular connectivity parameters for cellular communication between the second SIM 36 and the second cellular network 26. As stated before, the first and second SIMs 34, 36 comprise a dual SIM dual standby system with a single modem.

In an exemplary embodiment, block 60 and 62 comprise measuring a received signal strength indicator (RSSI) and a bit error rate (BER) for each of the first SIM 34 and the first cellular network 24, and for the second SIM 36 and second cellular network 26. At block 64, the method includes comparing the measured cellular connectivity parameters for the first SIM 34 to the measured cellular connectivity parameters for the second SIM 36. After comparing the cellular connectivity parameters for the first and second SIMs 34, 36, the method moves to block 66, and includes designating one of the first SIM 34 and the first cellular network 24 and the second SIM 36 and the second cellular network 26 as a primary network, and designating the other one of the first SIM 34 and the first cellular network 24 and the second SIM 36 and the second cellular network 26 as a secondary network.

After the primary and secondary networks have been initially designated, the system 10 continues to measure the cellular connectivity parameters for the primary network and the secondary network to determine if switching the designations is appropriate. Moving to block 68, the method includes measuring cellular connectivity parameters for the primary network. Simultaneously, at block 70, the method includes measuring cellular connectivity parameters for the secondary network.

In an exemplary embodiment, block 68 and 70 comprise measuring a received signal strength indicator (RSSI) and a bit error rate (BER) for each of the primary and secondary networks. At block 72, the method includes comparing the measured cellular connectivity parameters for the primary and secondary networks. If comparison of the primary and secondary networks indicates that the secondary network has better cellular connectivity, the method moves on to block 74, wherein the designation of primary and secondary networks is switched. In an exemplary embodiment, switching designation of the primary and secondary networks takes place when the measured RSSI for the secondary network exceeds the measured RSSI for the primary network by a pre-determined margin. In another exemplary embodiment, switching designation of the primary and secondary networks takes place when the measured BER for the primary network exceeds the measured BER for the secondary network by a pre-determined margin.

If comparison of the primary and secondary networks indicates that the primary network still has better cellular connectivity, the method moves on to block 76, wherein the designation of primary and secondary networks is confirmed and not switched.

Moving from either block 74 or 76, the method returns to blocks 68 and 70 once again, where the cellular connectivity parameters for the primary and secondary networks are again measured. The method repeats this loop continuously in multiple power modes, including a normal mode, wherein an engine of the vehicle 12 is running and all functionality of the communication system 10 is available, a discontinuous mode (DRX), wherein the engine is off, the communication system 10 is not active, but can receive signals, and a back-up mode (BUB), wherein the vehicle battery is disconnected and the communication system 10 runs on back-up power for emergency communications.

A cellular communications system 10 of the present disclosure offers several advantages. These include continuously monitoring the relative cellular connectivity between a first cellular network and a second cellular network so when a call is made, the system will have already identified the optimal network and designated such network as the primary network. This will save time, particularly in an emergency situation, when a cellular call is attempted by the vehicle. Further, the cellular communication system works in most modes of operation where an occupant is likely to be in the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cellular communication system for a vehicle, comprising:
   a controller;
   a modem in communication with the controller, the modem adapted to enable communication between the controller and a plurality of cellular networks;
   a plurality of subscriber identity modules (SIMs) within the controller, each of the plurality of SIMs adapted to provide cellular communication with a specified cellular network selected from the plurality of cellular networks via the modem; and
   a driver interface mounted within the vehicle and adapted to allow a driver of the vehicle to communicate with the controller,
   wherein the controller is adapted to evaluate each of the plurality of SIMs, compare each of the plurality of SIMs to one another, and to designate one of the plurality of SIMs and the corresponding specified cellular network as a primary network and to designate another one of the plurality of SIMS and a corresponding second specified cellular network as a secondary network,
   wherein the controller is adapted to evaluate the primary network and the secondary network to ensure the primary network can support functions of the cellular communication system in a plurality of power modes including, a normal mode, wherein an engine of the vehicle is running and all functionality of the cellular communication system is available, a discontinuous mode (DRX), wherein the engine is off, the cellular communication system is not active, but can receive signals, and a back-up mode (BUB), wherein a vehicle battery is disconnected and the cellular communication system runs on a back-up power for emergency communications, and
   wherein the controller is adapted to continuously re-evaluate each of the plurality of SIMs, compare each of the plurality of SIMs to one another, and re-designate the plurality of SIMs and the corresponding specified cellular networks as one of the primary network and the secondary network.

2. The cellular communication system of claim 1, wherein the plurality of SIMs within the controller comprise a dual SIM dual standby system including a first SIM adapted to communicate with a first cellular network and a second SIM adapted to communicate with a second cellular network.

3. The cellular communication system of claim 2, wherein the controller is adapted to measure cellular connectivity parameters for the first and second SIMs, wherein the first and second SIMs are evaluated and compared to one another based on the measured cellular connectivity parameters.

4. The cellular communication system of claim 3, wherein the cellular connectivity parameters include a cellular signal strength parameter.

5. The cellular connection system of claim 4, wherein the cellular signal strength parameter is a received signal strength indicator (RSSI).

6. The cellular communication system of claim 5, wherein the cellular connectivity parameters include a bit error rate (BER).

7. The cellular communication system of claim 6, wherein the controller is adapted to designate one of the first and second SIMs and the corresponding specified cellular network as the primary network and to designate the other one of the first and second SIMs and the corresponding specified cellular network as the secondary network.

8. The cellular communication system of claim 7, wherein the controller is adapted to switch designation of the primary and secondary network when the measured RSSI for the secondary network exceeds the measured RSSI for the primary network by a pre-determined margin.

9. The cellular communication system of claim 7, wherein the controller is adapted to switch designation of the primary and secondary network when the measured BER for the primary network exceeds the measured BER for the secondary network by a pre-determined margin.

10. A cellular communication system for a vehicle, comprising:
    a controller;
    a dual subscriber identity module (SIM) dual standby system including a first SIM adapted to communicate with a first cellular network and a second SIM adapted to communicate with a second cellular network;
    a modem in communication with the controller, the modem adapted to enable communication between the first SIM and the first cellular network and communication between the second SIM and the second cellular network; and
    a driver interface mounted within the vehicle and adapted to allow a driver of the vehicle to communicate with the controller,
    wherein, the controller is adapted to measure a received signal strength indication (RSSI) and a bit error rate (BER) for each of the first SIM and the second SIM and to designate one of the first SIM and the second SIM and the corresponding specified first cellular network or second cellular network as the primary network and to designate the other one of the first SIM and the second SIM and the corresponding specified first cellular network or second cellular network as the secondary network based on the RSSI and the BER for each of the first SIM and the second SIM, and
    wherein the controller is adapted to evaluate the primary network and the secondary network to ensure the primary network can support functions of the cellular communication system in a plurality of power modes including, a normal mode, wherein an engine of the vehicle is running and all functionality of the cellular communication system is available, a discontinuous mode (DRX), wherein the engine is off, the cellular communication system is not active, but can receive signals, and a back-up mode (BUB), wherein a vehicle battery is disconnected and the cellular communication system runs on a back-up power for emergency communications.

11. The cellular communication system of claim 10, wherein the controller is adapted to switch designation of the primary and secondary network when the measured RSSI for the secondary network exceeds the measured RSSI for the primary network by a pre-determined margin.

12. The cellular communication system of claim 11, wherein the controller is adapted to switch designation of the primary and secondary network when the measured BER for the primary network exceeds the measured BER for the secondary network by a pre-determined margin.

13. A method of selecting a primary and a secondary cellular network for a communication system in a vehicle comprising:
- measuring cellular connectivity parameters for cellular communication between a first subscriber identity module (SIM) and a first cellular network;
- measuring cellular connectivity parameters for cellular communication between a second SIM and a second cellular network, wherein the first SIM and the second SIM comprise a dual SIM dual standby system with a single modem;
- comparing the measured cellular connectivity parameters for the first SIM to the measured cellular connectivity parameters for the second SIM;
- designating one of the first SIM and the first cellular network and the second SIM and the second cellular network as a primary network, and designating the other one of the first SIM and the first cellular network and the second SIM and the second cellular network as a secondary network;
- measuring cellular connectivity parameters for the primary network and the secondary network, wherein measuring cellular connectivity parameters for the primary network and the secondary network further includes measuring cellular connectivity parameters for the primary network and the secondary network in a plurality of power modes, including a normal mode, wherein an engine of the vehicle is running and all functionality of the communication system is available, a discontinuous mode (DRX), wherein the engine is off, the communication system is not active, but can receive signals, and a back-up mode (BUB), wherein a vehicle battery is disconnected and the communication system runs on back-up power for emergency communications;
- comparing the measured cellular connectivity parameters for the primary and secondary networks; and
- switching designation of the primary and secondary network based on the measured cellular connectivity parameters for the primary and secondary networks.

14. The method of claim 13, wherein measuring cellular connectivity parameters for cellular communication between the first SIM and the first cellular network, and measuring cellular connectivity parameters for cellular communication between the second SIM and the second cellular network further includes measuring a received signal strength indicator (RSSI) and a bit error rate (BER) for each of the first SIM and the first cellular network, and the second SIM and the second cellular network.

15. The method of claim 14, wherein switching designation of the primary and secondary networks based on the measured cellular connectivity parameters for the primary and secondary networks further includes switching designation of the primary and secondary networks when the measured RSSI for the secondary network exceeds the measured RSSI for the primary network by a pre-determined margin.

16. The method of claim 14, wherein switching designation of the primary and secondary networks based on the measured cellular connectivity parameters for the primary and secondary networks further includes switching designation of the primary and secondary networks when the measured BER for the primary network exceeds the measured BER for the secondary network by a pre-determined margin.

* * * * *